(No Model.)
A. C. FARNSWORTH.
BALL BEARING AXLE.
No. 563,466. Patented July 7, 1896.
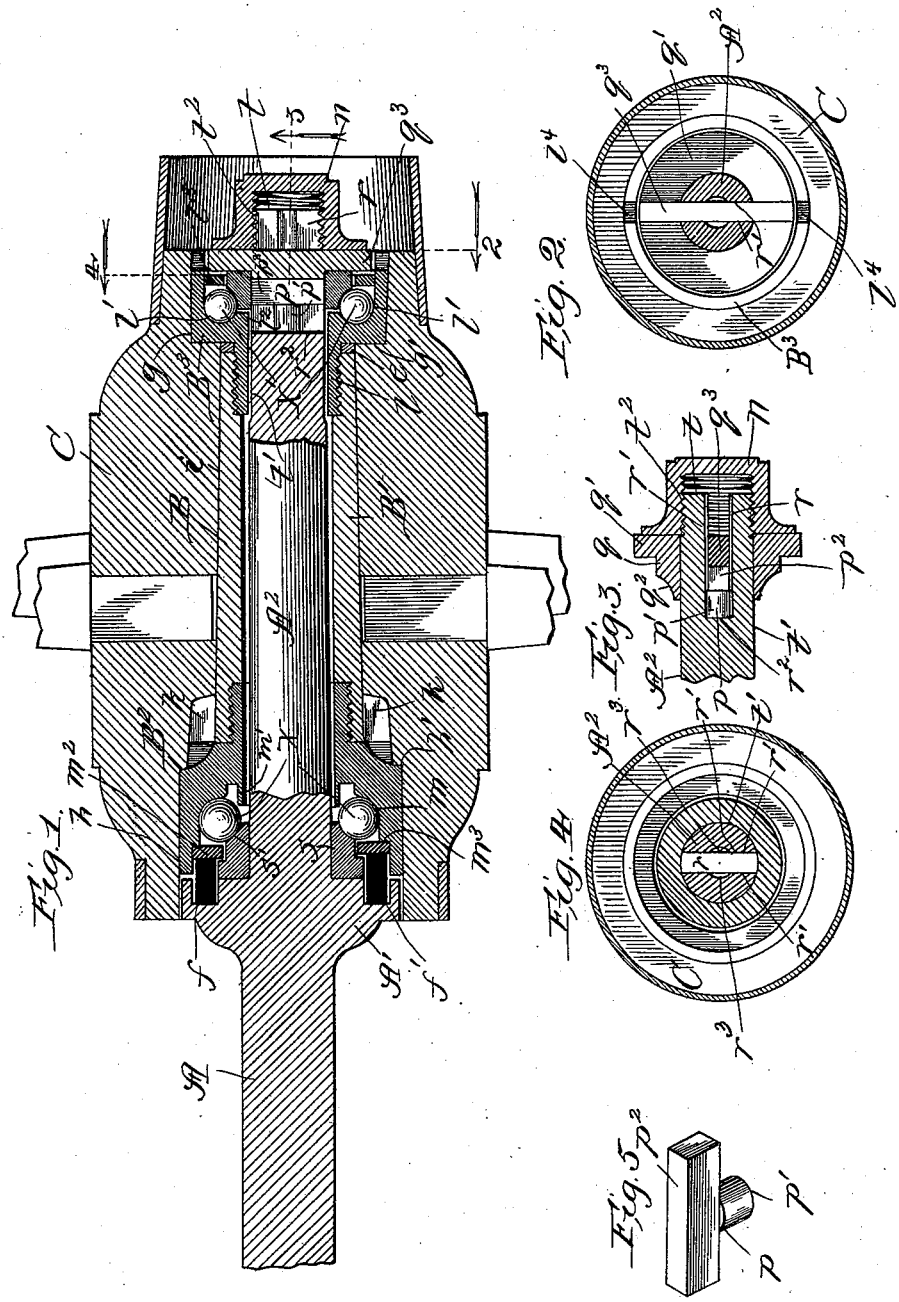
Witnesses:
John H. Lee
Little J. Alter
Inventor:
Andrew C. Farnsworth,
By Dyrenforth & Dyrenforth,
Attys.
THE NORRIS PETERS CO., PHOTO-LITHO., WASHINGTON, D. C.

UNITED STATES PATENT OFFICE.

ANDREW C. FARNSWORTH, OF CHICAGO, ILLINOIS, ASSIGNOR, BY MESNE ASSIGNMENTS, TO E. C. RITSHER, OF SAME PLACE.

BALL-BEARING AXLE.

SPECIFICATION forming part of Letters Patent No. 563,466, dated July 7, 1896.

Application filed August 30, 1895. Serial No. 560,998. (No model.)

*To all whom it may concern:*

Be it known that I, ANDREW C. FARNSWORTH, a citizen of the United States, residing at Chicago, in the county of Cook and State of Illinois, have invented a new and useful Improvement in Ball-Bearing Axles, of which the following is a specification.

My invention relates more especially to improvement in the construction of ball-bearing axles for vehicles, though certain features of my invention may be applicable to ball-bearing journals generally.

My object is to improve the construction of ball-bearings, more especially as applied to vehicle-axles, to the end of rendering them particularly easy running, simple, strong, and durable, free from danger of binding or of becoming loose in use, and readily adjustable to take up wear.

To the above ends my invention consists in the general construction of my improvements, and also in details of construction and combinations of parts, all as hereinafter set forth and claimed.

In the drawings, Figure 1 is a broken sectional view of a hub and ball-bearing axle involving my improvements; Fig. 2, a section taken on line 2 of Fig. 1 and viewed in the direction of the arrow; Fig. 3, a broken section of the end portion of the axle-spindle and parts carried thereby, the section being taken on line 3 of Fig. 1; Fig. 4, a section taken on line 4 of Fig. 1 and viewed in the direction of the arrow, and Fig. 5 a perspective view of a winged pin forming one of the details of the construction.

A is a vehicle-axle provided with a head or flange A' and a spindle A². The spindle is formed with a smooth squared end $t$, and adjacent to said end it is slightly reduced in diameter, as shown at $t'$. The spindle tapers slightly from the head A' to the said reduced portion more readily to permit the placing upon the spindle of a ring or annular cone $s$, which fits against the head and is crowded into position to be rigid with reference to the axle. The cone $s$ forms an inner race member and is provided with an annular concave bearing-surface $s'$. In the end portion of the spindle and extending transversely through the latter is a socket $r$, having parallel side walls $r'$ $r'$ and a base $r^2$, affording a bearing-surface or stop, the socket extending inward the relative distance indicated in the figures. At opposite sides of the center of the socket $r$ are concave recesses $r^3$ in the walls $r'$, extending from the end of the spindle to the base or stop $r^2$, the recesses being in the arc of a circle drawn from a point centrally of the spindle. The outer end portion of the spindle is provided with a screw-thread $t^2$.

Fitting upon the reduced portion $t'$ of the spindle is an annular cone-piece $q$, having a flange $q'$ and concave bearing-surface $q^2$. Fastened in the flange $q'$ is a transverse bar $q^3$, which, if desired, may be cast with and form an integral portion of the cone-piece. The bar $q^3$ is of a width in cross-section to fit and slide loosely in the socket $r$ as the cone-piece is slid upon the spindle.

Fitting loosely in the socket $r$ to slide therein is a spacing-lug $p$, formed with a cylindrical stem or shank $p'$ of a size in cross-section to fit the recesses $r^3$ in the socket and having a head $p^2$, forming wings fitting loosely between the walls or surfaces $r'$ of the socket.

Fitting over the end $t$ of the spindle and engaging the thread $t^2$ is a nut or screw-cap $n$, adapted to bear against the outer face of the cone-piece $q$. In placing the parts named upon the end portion of the spindle the spacing-lug $p$ is passed at its shank portion into the opening formed by the recesses $r^3$ to extend with its wings between the walls $r'$, and with the end of its shank against the base or stop $r^2$ of the socket. The cone-piece is then passed over the end of the spindle with its bar $q^3$ in the socket $r$. Inward screwing of the cap $n$ causes it to bear against the cone-piece $q$ and clamp it against the spacing-lug $p$. The meeting surfaces of the parts are made as smooth as possible and to conform to each other, whereby when the cone-piece is clamped in place by the screw-cap $n$ it is held rigidly against movement in any direction.

B is an axle or journal box, comprising a sleeve portion B' and shells or ball-boxes B² B³ at opposite ends of the sleeve. The ball-box B² may be a separate piece adapted to screw into the end of the sleeve B', as shown in Fig. 1, or it may be formed integral with the sleeve. The shell B² has an annular concave bearing-surface $m$ for balls X, and the latter are held loosely in place against falling out by means of an annular retaining-lip $m'$, formed integral with the shell, and a metal ring or retaining-washer $m^2$, which is crowded into the end of the shell against a shoulder $m^3$ therein. The shell B³ has a sleeve or shank portion $l$, adapted to screw into the end of the sleeve B, and an annular concave bearing-surface $l'$ for balls X', which are held loosely in place against falling out by means of an annular lip or shoulder $l^2$, integral with the shell, and a metal ring or retaining-washer $l^3$, which is crowded into the end of the shell, as shown. The shell B² is somewhat larger in diameter than the shell B³, and the sleeve B tapers slightly from the shell B² to the shell B³. On the sleeve adjacent to the shell B² are radially-extending feathers or fins $k$. The hub C is provided with a tapering opening $i$ and enlarged chambers $h$ $g$ at opposite ends of the opening.

To insert the axle-box in place, the sleeve B' is driven into the tapering opening $i$, its feathers $k$ engaging or indenting the hub material to hold the sleeve and hub rigidly together. The shell B² is then screwed into the sleeve until it engages an annular shoulder $h'$ in the chamber $h$, and the shell B³ is screwed into the opposite end of the sleeve until it engages a shoulder $g'$ at the base of the chamber $g$. In the outer end of the shell B³ are sockets $l^4$ to receive a suitable wrench, which it would be necessary to employ to turn the shell.

To place the hub, with the axle-box fixed thereto, as described, upon the spindle A², it is passed over the latter until the balls X engage the surface $s'$ of the cone or race member $s$. The spacing-lug $p$ is then inserted into position as described, and the cone-piece $q$ is passed over the end of the spindle and tightened by means of the cap $n$ against the spacing-lug, as before stated. The spacing-lug should be just large enough to cause the surface $q^2$ of the race member $q$ and surface $s'$ of the race member $s$ to bear against the balls and press them to the surfaces $m$ $l'$, whereby the surfaces will be held against any relative play longitudinally of the spindle and the balls will be sufficiently loose to prevent their binding. The chamber $h$ at its outer end overlaps and is close to, but out of contact with, the outer circumferential face of the head or flange A'; and the chamber $g$ at its outer end overlaps and is out of contact with the outer circumference of the cone-piece or race member $q$. The overlapping end of the chamber $g$, flange $q'$ of the cone-piece, and washer $l^3$ will all tend to house the outer ball-bearing against access thereto of dust and moisture. The inner ball-bearing is housed against access of dust and moisture by the collar $m^2$ and overlapping end of the chamber $h$. As a further protection, however, I prefer to provide the head A' with an annular socket $f$ to receive a felt or other washer $f'$, which projects into a socket, formed between the cone $s$ and shell B², close to or in loose contact with the retaining-washer $m^2$.

As I prefer to construct the parts, the sleeve B' may be of steel, wrought-iron, brass, or any other suitable metal, and the shells B² B³ of steel, either hard throughout or hardened at their concave bearing-surfaces. In this way I dispense with the separate cone-pieces or race members, which are usually inserted into the shells, and I not only in this manner provide stronger race members, but am enabled to use larger balls in shells of the same size as hitherto provided. The convex surfaces of the race members are an advantage over straight surfaces, because they fit around the balls in a manner to produce a comparatively large area of bearing-surface therefor.

In the event that the hub into which my improved ball-bearing axle is inserted should be longer than the distance from the inner side of the head A' to the outer face of the cone-piece $q$, when the parts are in place, one or more washers $e$ may be placed upon the shank $l$ of the shell B³ to space the latter from the end of the sleeve B', as shown. This is an advantage over all other constructions of which I am aware, because they require that the hub and axle shall be made to conform to each other with great exactness.

When, on account of wear upon the bearings, it becomes necessary to adjust the race members closer together, this may be done by withdrawing the spacing-lug $p$ and reducing the length of the stem $p'$ with a file, or, preferably, with emery-paper. When in place, the end of the stem $p'$, as before stated, bears against the base of the socket $r$, and, as the latter extends transversely through the spindle, the surface $r^2$ may be easily cleaned when desired. The engagement of the bar $q^3$ with the socket $r$ prevents any tendency toward rotation of the cone-piece $q$ upon the spindle, and as a consequence the screw-cap $n$ alone will hold the parts rigidly in place and no jam or lock nuts are required.

The construction of the adjusting mechanism causes the race members to be perfectly true and prevents their canting or pitching to either side, thereby presenting to the balls perfectly smooth, even, and firm surfaces on which to travel. The engagement of the stem $p'$ with the recesses $r^3$ prevents any lateral slipping of the spacing-lug when inserted into the socket $r$.

While I prefer to provide my improvements in every way as shown and described, the construction may be changed in the matter of details without departing from the spirit of my invention as defined by the claims.

What I claim as new, and desire to secure by Letters Patent, is—

1. In a ball-bearing journal, the combination of a spindle provided with a relatively stationary race member, a box provided at opposite ends with chambers presenting race members, balls in said chambers, an adjustable race member on the outer end portion of the spindle, a stop on the spindle, a removable spacing-lug between the said stop and said adjustable race member, and a nut on the outer end portion of the spindle, operative to clamp the said adjustable race member against the spacing-lug, substantially as and for the purpose set forth.

2. In a ball-bearing journal, the combination of a spindle, provided with a relatively stationary race member on its inner end portion, and a transverse socket in its outer end portion presenting a stop, a box provided at opposite ends with chambers presenting race members, balls in said chambers, an adjustable race member on the outer end portion of the spindle provided with a bar to slide in said socket, a spacing-lug in said socket confined between the said adjustable race member and the said stop, and a nut on the outer end portion of the spindle, operative to clamp the said adjustable race member against the spacing-lug, substantially as and for the purpose set forth.

3. In a ball-bearing journal, the combination with the journal-box provided with end chambers presenting race members and balls, of a spindle provided with a race member at its inner end portion, and centrally enlarged transverse sockets in its outer end portion, a spacing-lug formed with a stem fitting and sliding in the enlarged portion of the said socket and wings sliding in the narrower portions thereof, an adjustable race member on the outer end portion of the spindle provided with a transverse bar fitting and sliding in the said socket, and a nut on the outer end portion of the spindle operative to clamp the said adjustable race member against the spacing-lug and the latter against the base of said socket, substantially as and for the purpose set forth.

4. In a ball-bearing journal, the combination of an axle having a head $A'$ provided with an annular recess $f$ and a spindle $A^2$ provided in its outer end with a socket $r$, a race member $s$ adjacent to the head $A'$, a box B comprising a sleeve provided at opposite ends with shells having annular inner concave bearing-surfaces forming race members, balls and ball-retaining rings in the shells, a washer $f'$ in the recess $f$ projecting into the adjacent end of the box, a spacing-lug in the said spindle-socket, an adjustable race member on the outer end portion of the spindle, a bar on the said adjustable race member movable in the said socket against the said spacing-lug and a nut on the outer end of the spindle operative to clamp the said adjustable race member against the spacing-lug and position the race members with relation to each other, all constructed and arranged to operate substantially as and for the purpose set forth.

ANDREW C. FARNSWORTH.

In presence of—
  J. N. HANSON,
  J. L. DAVIS.